United States Patent [19]
Hirose et al.

[11] 3,788,503
[45] Jan. 29, 1974

[54] METHOD FOR PRODUCING BIAXIALLY MOLECULE-ORIENTED POLY-ε-CAPROAMIDE RESIN FILM

[75] Inventors: Hidenori Hirose; Masaaki Tsubosaki; Masayoshi Sugiyama; Akira Skkita; Mitsuo Kito, all of Fujishi, Japan

[73] Assignee: Kabushiki Kaisha Kohjin, Tokyo, Japan

[22] Filed: Dec. 10, 1970

[21] Appl. No.: 96,741

[30] Foreign Application Priority Data
Dec. 30, 1969 Japan............................ 44-105459
Feb. 24, 1970 Japan............................ 45-15243

[52] U.S. Cl............... 264/95, 264/209, 264/210 R, 264/289
[51] Int. Cl............................................. B29c 17/06
[58] Field of Search... 264/289, 88, 89, 209, 94, 95, 264/99, 210 R; 260/78 S

[56] References Cited
UNITED STATES PATENTS

| | | | |
|---|---|---|---|
| 2,968,065 | 1/1961 | Gronholz | 264/289 |
| 3,632,728 | 1/1972 | Kuga et al. | 264/289 |
| 3,651,200 | 3/1972 | Kuga et al. | 264/289 |
| 2,987,767 | 6/1961 | Berry et al. | 264/209 |
| 3,280,079 | 10/1966 | Brown | 264/176 R |
| 3,300,555 | 1/1967 | Bild et al. | 264/209 |
| 3,313,870 | 4/1967 | Yazawa | 264/209 |
| 3,304,352 | 2/1967 | Gerow | 264/209 |
| 3,400,184 | 9/1968 | Matsuo et al. | 264/95 |
| 3,426,113 | 2/1969 | Yazawa | 264/95 |
| 3,449,299 | 6/1969 | Schneider et al. | 264/95 |
| 3,502,766 | 3/1970 | Tructa et al. | 264/289 |
| 3,514,460 | 5/1970 | Lawrance et al. | 264/210 R |
| 3,560,606 | 2/1971 | Kuga et al. | 260/78 S |

Primary Examiner—Jay H. Woo
Attorney, Agent, or Firm—Fred C. Philpitt

[57] ABSTRACT

A biaxially molecule-oriented film of poly-ε-caproamide resin having an improved dimensional stability and surface slip characteristic is prepared by extruding the molten resin downward through an annular die, quenching and solidifying the extruded film by means of an internally liquid-cooled, cooling mandrel having a specific shape to form a substantially amorphous, non-stretched tubular film substantially free of any hydrogen bond, allowing the thus obtained film to come in contact with a heating gas while heating the film at a temperature of from 45° to 70°C and keeping a water content of the film at not more than 2 % based on the weight of the film, biaxially stretching the heated film simultaneously at a stretching ratio of 2 to 4 in both longitudinal and transversal directions by introducing a pressurized gas into the tubular film between a low speed feeding section and a high speed take-up section of the film, and heat-setting the thus stretched film while keeping a water content of the film at least at 1 % based on the weight of the film to an equilibrium water absorption content in water.

17 Claims, 4 Drawing Figures

I RANGE WHERE TUBULAR STRETCHING IS POSSIBLE.

II PREFERABLE RANGE.

III NUMBER OF FRACTURE OF STRETCHING TUBE SO INCREASES THAT CONTINUATION OF TUBULAR STRETCHING IS DIFFICULT.

IV UNSTRETCHED PARTS REMAIN RESULTING IN UNEVENLY STRETCHED FILM.

V TEMPERATURES ARE SO LOW THAT EXTREMELY LARGE STRETCHING STRESSES ARE REQUIRED AND TUBULAR STRETCHING IS DIFFICULT.

VI STRETCHING BECOMES EXTREMELY UNEVEN, NON-STRETCHING PARTS REMAIN AND TRANSPARENCY OF STRETCHED PART IS NOT GOOD.

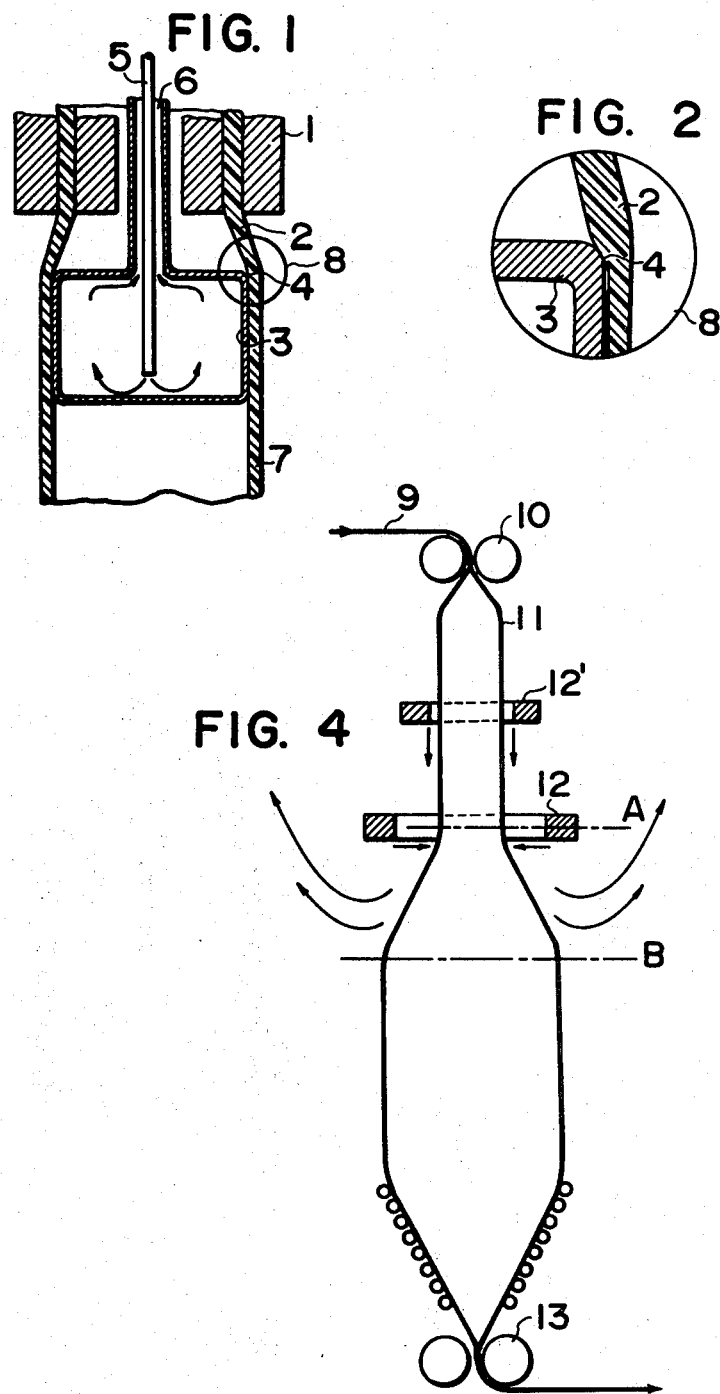

FIG. 3

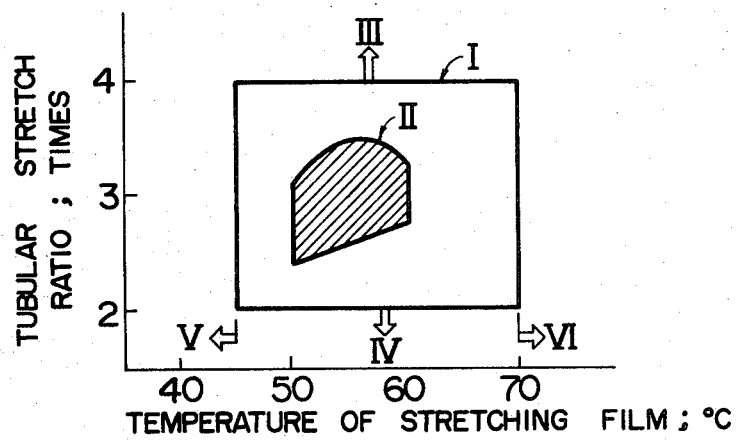

I  RANGE WHERE TUBULAR STRETCHING IS POSSIBLE.

II  PREFERABLE RANGE.

III  NUMBER OF FRACTURE OF STRETCHING TUBE SO INCREASES THAT CONTINUATION OF TUBULAR STRETCHING IS DIFFICULT.

IV  UNSTRETCHED PARTS REMAIN RESULTING IN UNEVENLY STRETCHED FILM.

V  TEMPERATURES ARE SO LOW THAT EXTREMELY LARGE STRETCHING STRESSES ARE REQUIRED AND TUBULAR STRETCHING IS DIFFICULT.

VI  STRETCHING BECOMES EXTREMELY UNEVEN, NON-STRETCHING PARTS REMAIN AND TRANSPARENCY OF STRETCHED PART IS NOT GOOD.

METHOD FOR PRODUCING BIAXIALLY MOLECULE-ORIENTED POLY-ε-CAPROAMIDE RESIN FILM

This invention relates to a novel method for producing a poly-ε-caproamide film biaxially molecule-oriented in the longitudinal and transversal directions, which has excellent physical properties.

It is well known that various physical properties, for example, strength, have been heretofore improved by orienting the molecules in the biaxial directions through the stretching of thermoplastic resin films. As the methods for biaxially stretching such thermoplastic resin films, there have been known 1. the so-called, two-stage, biaxially streching method comprising stretching the film in a longitudinal direction and then stretching the same in a transversal direction at a temperature above the glass transition temperature but below the crystal melting temperature,
2. the so-called tubular, biaxially stretching method comprising biaxially stretching a tubular film in both longitudinal and transversal directions at the same time by introducing a gas into the tubular film under pressure,
3. the method for biaxially stretching a film in both longitudinal and transversal directions at the same time by means of a tenter, and so on.

However, when the two-stage, biaxially stretching method is applied to a poly-ε-caproamide resin film, a hydrogen bond oriented in the initially stretched direction is brought about, and therefore it is very difficult to carry out a uniform stretching in the succesive transversal stretching. That is, the transversal stretching turns to a considerable neck stretching and consequently a uniform film cannot be obtained.

When the so-called tenter-type, simultaneous, biaxially stretching method is applied to the poly-ε-caproamide resin, selvages of films having a thickness four-20 times the thickness of the stretched film must be held by clips, and therefore the clipped parts and the unstretched, thick parts near the clipped parts become a loss. That is, the yield of the stretched film is considerably lowered.

It is an object of the present invention to provide a method for porducing a biaxially stretched poly-ε-caproamide film having a superior transparency free of unstretched part and a high strength in both longitudinal and transversal directions.

It is another object of the present invention to provide a method for stretching tubular poly-ε-caproamide films in a stabilized continuous manner for a long period of time.

It is a further object of the present invention to provide a method for producing tubular poly-ε-caproamide films having a dimensional stability and an improved slip characteristic of surface.

Other objects and advantages of the present invention will be apparent from the description which follows hereinafter. These objects and advantages can be obtained by the method of the present invention.

According to the method of the present invention, a substantially amorphous unstretched tubular film of a poly-ε-caproamide having substantially no hydrogen bond and containing less than 2 % (inclusive) of water based upon the weight of said film is contacted with a heating gas so as to be heated at a temperature of 45° to 70°C (inclusive) and simultaneously stretched in both longitudinal and transversal directions by introducing a gas into the inside of the part of the tubular film between a low speed feeding part of the film and a high speed take-up part of the same film.

Now, the present invention is explained in detail, referring to the accompanying drawings.

FIG. 1 is a schematic view of a vertical cross-section of a die outlet part and a mandrel useful for producing a non-stretched tubular film which is a raw material for the production of a biaxially stretched tubular film according to the method of the present invention.

FIG. 2 is an enlarged view of the shoulder part of the mandrel (encircled part 8).

FIG. 3 is a diagram showing the range of stretch ratios vs. film temperatures in which a tubular stretching can be conducted.

FIG. 4 is a schematic view of a vertical cross-section of a tubular biaxial stretching apparatus according to the method of the present invention.

When a biaxially oriented poly-ε-caproamide film is to be produced, it is necessary to prepare, first of all, a non-stretched film to be stretched. When a tubular film is prepared, a molten resin is extruded in a tubular state from a slit of a ring form die attached to an extruder, and then cooled through direct or indirect contact with air and/or water from both inside and outside of the film.

That is, the poly-ε-caproamide resin is melted and extruded into a tubular film, and the tubular film is quenched and solidified through contact with a cooling metal surface and/or a cooling fluid at a temperature below 50°C, whereby a substantially amorphous film substantially free of a hydrogen bond is prepared.

At that time, the outside surface of the melt-extruded tubular film is uniformly cooled with an air uniformly blown through an air ring provided around the outer circumference of the film or through a direct contact with a cooling liquid held in a cooling liquid tank, and the inside surface of the film is cooled through a direct sliding contact with the outer wall of an internally cooled, cooling mandrel suspended at the die. The shape of the mandrel has a substantially circular cross-section as shown in FIG. 1, and the mandrel consists of the first section wherein at least the diameter gradually increases, and the second section wherein the folding diameter of the tubular film is controlled after the molten film has contacted the mandrel. In the first section an angle of inclination of the contact surface to the plane rectangular to the axis of the mandrel is not more than 45° and a radius of curvature at an upper edge part of the cooling mandrel, which first contacts the molten tubular film, is not more than 5 mm. In the second section, the diameter of the mandrel gradually decreases or increases.

According to the conventional methods for producing a tubular film by means of a mandrel, the molten film is cooled and solidified through a contact with the drum part of the cylindrical mandrel or through a contact with a tapered surface of an inversely conical mandrel, or with other shaped surface of the mandrel. However, according to the conventional method, the tubular film in the molten state is liable to undergo deformation in the shape of tubular film owing to a fluctuation in the inside pressure of the film, the surrounding temperature outside the film, or the resin temperature, or the like. Consequently, the level of contact points of the film with the circumference of the cooling mandrel cannot be kept even, and thus the film is liable to be deformed and has occurences of finger print-like spots. Further, the evaporated matters evolving from the molten resin are condensed on the mandrel, and the condensates are accumulated and give rise to the finger print-like spots through the deposition of the condensates onto the film. These are the disadvantages of the conventional methods.

According to the present invention, a tubular film can be uniformly prepared by using a cooling mandrel having an angle of inclination of the cooling surface to the plane rectangular to the axis of the mandrel of not more than 45° and a radius of curvature at the upper edge part of the mandrel of not more than 5 mm and allowing the molten film to come in contact with the part of said radius of curvature at the upper edge part, because the fluctuation in the contact position of the film with the mandrel can be kept less even if the molten film is fluctuated. Further, even if the evaporated matters from the resin are deposited on the mandrel, they are carried away little by little with the sliding film, and therefore no finger print-like spots are developed on the film surface.

For example, when the molten poly-ε-caproamide resin was extruded at a resin temperature of 260°C and produced into films by two kinds of internally-cooled, cooling mandrels having a chromium-plated surface, having an angle of inclination of the surface to the plane rectangular to the axis of the mandrel of 0° and the radii of curvature, R, of 3 mm and 20 mm, respectively, no finger print-like spots were brought about at all on the film surface in the case of the mandrel having R of 3 mm and a good tubular film having a uniform thickness could be continuously obtained for more than 8 hours. On the other hand, in the case of the mandrel having R of 20 mm, the finger print-like spots frequently occured or considerable spot pulsation in the film thickness developed in machine direction even by adjusting the pressure within the molten tube or the cooling conditions, or take-up speed or other film-making conditions etc. to various degrees. That is, no stability was obtained in film making even for a short period of time. Furthermore, even in the case of the cooling mandrel having R of less than 5 mm, the finger print-like spots likewise occured and the film was not made smoothly, when the angle of inclination of the surface to the plane rectangular to the axis of the mandrel was more than 45°.

When a film is to be prepared by means of such a mandrel, it is necessary to effect external cooling also from the outside of the film. That is, the external cooling is carried out through air cooling or by means of a cooling liquid in the cooling liquid tank. Furthermore, a wet-type mandrel may be employed as the inside mandrel, if necessary. In such a film making, the water content of the film is never brought to more than 2 percent, and water is usually employed as an economical cooling liquid.

As explained above, a substantially amorphous, non-stretched, tubular film of poly-ε-caproamide resin substantially free of hydrogen bond can be formed by quenching and solidifying a molten resin through an external cooling with air or a cooling liquid in a cooling liquid tank as well as an internal cooling by means of an internally water-cooled mandrel having the above-mentioned features.

The thus obtained, non-stretched tubular film is then transferred to a biaxial stretching step.

The present inventors have confirmed through experiments that it is not desirable that the thus obtained, substantially amorphous, non-stretched tubular film substantially free of hydrogen bond undergoes a heat history at a temperature higher than 50°C for more than 30 minutes before the stretching and that the film must have more than 2 percent of water on the basis of the weight of the film before the stretching. The reasons are that, when a heat history is given to the quench-solidified, non-stretched tubular film at a temperature higher than 50°C for more than 30 minutes, or when the film contains more than 2 percent of water, crystals and stable hydrogen bonds are formed, and a high temperature and high stress are required for stretching the tubular film.

When a stretching temperature is increased to stretch the tube of poly-ε-caproamide resin within a limit of the internal stretching pressure, a considerable neck stretching is brought about, and non-stretched portions remain within a limit of stable stretching ratio. Furthermore, even the stretched portions will have a poor transparency.

For example, non-stretched films were prepared by melt-extruding a poly-ε-caproamide resin through an annular die and quenching and solidifying the extruded tubular film by allowing the inside surface of the film to come in contact with a cooling metallic cylinder, through which water is circulated at 15°C, and also allowing the outside surface of the tube to come in contact with water at 15°C, and the thus prepared films were subjected to tests of tube stretchability under the following conditions:

1. no treatment immediately after the film making,
2. heat treatment in air at 55°C for 30 minutes,
3. immersion of the film in water at 20°C for one hour to make the film absorb 2.5 percent of water on the basis of the weight of said film,
4. immersion of the film in water at 95°C for one minute to make the film absorb 2.3 percent of water on the basis of the weight of said film.

The results are shown in Table 1.

TABLE 1

| Film treating condition | Tubular film stretching state | Transparency |
|---|---|---|
| No treatment immediately after film making | Uniform stretching is possible at a film temperature of 45°–70°C | Very excellent |
| Heat treatment in air at 55°C for 30 minutes | Film temperature above 160°C is required, and considerable neck stretching develops and non-stretched portions remain within a limit of stable stretching ratio | Partially transparent, traversely non-stretched portions remains. Stretched portion has a poor transparency |
| Immersion in water at 20°C for one hour to absorb 2.5 % of water | Same as above | Same as above |
| Immersion in water at 95°C for one minute to absorb 2.3 % of water | Same as above | Same as above |

Experiments on a relation between the water content of the non-stretched tubular film and the stretchability of the tubular film were carried out, and the results are shown in Table 2.

TABLE 2

| Water Content (% by weight) | Stretchability of tubular film |
|---|---|
| 0.3 | A stretched film having an excellent uniform transparency can be obtained at a stretching temperature of 45°–70°C. |
| 0.8 | Same as above |
| 1.2 | Somewhat larger stress is required for the stretching, and the neck stretching becomes considerable. To make the non-stretched portions completely disappear, stretching must be carried out at least 2.7 times as long. |
| 1.8 | Very large stress is required for the stretching and the neck stretching becomes considerable. To make the non-stretched portions completely disappear, stretching must be carried out at least 3.5 times as long. The film is hard to stretch in a stabilized manner for a long period of time. |
| 2.0 | The neck stretching is considerable, and the non-stretched portions connot be made to completely disappear within the limit of stretching ratio at which no rupture of the tubular film takes place. |
| 2.5 | Same as above |

In Table 2, the substantially amorphous poly-ε-caproamide non-stretched tubular films obtained in the same manner as referred to in Table 1 are left to the atmosphere at a temperature of 20°C and a relative humidity of 80 %, and the stretchabilities of the tubular films having water contents of 0.3 %, 0.8 %, 1.2 %, 1.8 %, 2.1 % and 2.5 % on the basis of the weight of said tubular film are illustrated. As is clear from the experimental results, it is necessary that the water content of the non-stretched film is not more that 2 %, preferably not more than 1%. Such a phenomenon is considered to arise from the fact that, in the case of the poly-ε-caproamide resin, the mobility of molecular chains is increased by absorption of water, and as a result a transfer to more stable molecular arrangement than the plasticization effect of water and occurence of hydrogen bonds are brought about to inhibit the biaxial stretchability of the tubular film.

A suitable stretching temperature and stretching ratio for stretching a tubular film of poly-ε-caproamide resin are explained hereunder. When the substantially amorphous, non-stretched film substantially free of any hydrogen bond is not subjected to a heat history at a temperature higher than 50°C for more than 30 minutes, and contains not more than 2 percent of water on the basis of the non-stretched film, a uniform biaxial stretching is possible in a temperature range of said tubular film from 45° to 70°C in a zone from the starting point of stretching to the end point of stretching of the tubular film (which will be referred to as "stretching zone"). As a result, a biaxially, molecule-oriented film having an excellent transparency can be obtained. In other words, a considerable neck stretching is obtained if the temperature of the tubular film exceeds 70°C in the stretching zone, and the non-stretched portions remain, as explained above, within the limit of the stable stretching ratio and the transparency of the stretched portion becomes poorer. On the other hand, a very great stress is required in the zone at a film temperature lower than 45°C, and consequently it is difficult to obtain the stretching ratio necessary for effecting the biaxial, molecular orientation effect in the stretching of the tubular film.

The glass transition temperature of poly-ε-caproamide resin is 48°C in the case of the water content of 0 %, 20°C in the case of the water content of 0.8 %, and −20°C in the case of the water content of 3 percent.

Practically the water content of the non-stretched tubular film immediately after making the tubular film is 0.4 to 0.7 %, and therefore the glass transition temperature is 33°C to 23°C. It has been found that the stretching of the tubular film is practically possible by making a stretching temperature higher at least by about 12°C than the glass transition temperature.

In Table 3, are shown results obtained when a non-stretched tubular film having a water content of 0.6 % prepared in the same manner as referred to in Table 1 was stretched at various temperatures.

TABLE 3

| Surface temperature of tubular films in the stretching zone (°C) | State of stretching of the tubular film |
|---|---|
| 40 | A very high stress is required for stretching, and the tubular film is liable to be frequently torn offf in a mechanical direction from the point near the starting point of the stretching. |
| 50 | Very stable stretching of the tubular film is possible, and the thus stretched film has an excellent uniformity and transparency. |
| 60 | Same as above |
| 68 | A great stress is required for the stretching, and the neck stretching is considerable. To make the non-stretched portions completely disappear, the stretching ratio of more than 3.6 is required, and therefore it is difficult to continue the stable stretching of the tubular film for a long period of time. |
| 75 | A very great stress is required for the stretching, and the neck stretching is very considerable. EVen at the stretching ratio of 4.0, the non-stretched portions partially remain, whereas the stretching at the ratio of more than 4.0 is impossible due to the rupture of the tubular film. Further, the transparency of the stretched portions is poor. |

As is clear from the foregoing experimental results, a considerable neck stretching takes place at a film temperature of more than 70°C, and, as a result, the transparency of the stretched portions becomes poorer. This is due to the fact that the stable molecular arrangement and hydrogen bond are rapidly brought about.

As explained above, the stretching temperature is in a range of 45° to 70°C, preferably 50° to 60°C in the present invention.

The stretching ratio of the non-stretched, tubular film depends upon the stretching temperature of the tubular film, but a stretching ratio of more than 2.4 is necessary at the stretching temperature of 50°C, and a stretching ratio of more than 2.8 is necessary at the stretching temperature of 60°C. The upper limit of the stretching ratio depends upon an increase in the rupture frequency of said tubular film due to the increase in inside pressure for stretching the tubular film. The upper limit of such stretching ratio is in a complicated correlation with the stretching temperature. As shown in FIG. 3, a curve between the temperature and stable stretching ratio of the tubular film shows a maximum value in a proper range of stretching temperatures owing to an increase in compliance of the tubular film caused by the increase in a mobility of the molecular chain with an increase in the stretching temperature, and a change of the molecular arrangement towards more stable direction for controlling the increase of the compliance as well as an occurence of hydrogen bonds.

On the other hand, when the tubular film of poly-ϵ-caproamide resin is stretched, it is difficult to continue the stretching of the tubular film in a stabilized manner for a long period of time by fixing the starting point of stretching. The reason seems to lie in that no increase in the compliance due to the increase in temperature, as seen in the ordinary thermoplastic resin film at a temperature higher than the glass transition temperature, is observed in stretching the tubular film of poly-ϵ-caproamide resin. Therefore, it is very difficult to fix the starting point of stretching when the tubular film of poly-ϵ-caproamide resin is stretched according to the heating system heretofore well known.

As a result of strenuous studies on a method for stretching a tubular film in a stabilized manner for a long period of time by fixing the starting point of stretching when the tubular film of poly-ϵ-caproamide is stretched, the present inventors have found that a method for allowing a surface of a tubular film to come in contact with a temperature-controlled gas at least within the stretching zone is very effective. To make the tubular film reach the stretching temperature, it is necessary that a suitable range of distance for allowing the tubular film to come in contact with the heating gas is a distance, not more than five times, preferably 2 to 3 times the diameter of the non-stretched tubular film in a travelling direction of the tubular film. If the distance exceeds 5 times the diameter of the non-stretched tubular film, the starting point of stretching is liable to be fluctuated, and consequently, it is difficult to continue the stretching of the tubular film in a stabilized manner, because the diameter of the tubular film is fluctuated after the stretching. According to the present invention, the heating gas which makes the tubular film reach the stretching temperature is arranged to flow along the travelling direction of the tubular film from the point near the starting point of stretching. For example, when a heating gas is blown in a direction almost perpendicular to the travelling direction of the tubular film from an air ring 12 provided at the position near the starting point of stretching A, the heating gas flows along the outside surface of the tubular film, until it turns to an ascending gas stream, and therefore can heat the tubular film in a wide range in the travelling direction of the tubular film. Therefore, by blowing a gas having a little lower temperature than that of the heating gas downward from an air ring 12' additionally provided, the starting point of stretching can be stabilized, as shown in FIG. 4.

As explained above, the present invention is to provide a method for producing a biaxially, molecule-oriented film of poly-ϵ-caproamide resin having an excellent transparency by melt-extruding a poly-ϵ-caproamide resin, quenching and solidifying the thus extruded tubular film and stretching the thus obtained, substantially amorphous tubular film substantially free of hydrogen bonds at a temperature of 45° to 70°C biaxially in both longitudinal and transversal directions at a stretching ratio of 2.0–4.0, respectively, as soon as possible without giving any heat history thereto at a temperature higher than 50°C for more than 30 minutes before the stretching, while keeping a water content of the film at not more than 2 percent on the basis of the weight of the film.

Generally, the strength and other characteristics of a thermoplastic resin film can be considerably improved by biaxially stretching the film, but the stretched film tends to shrink in a direction towards the state of the original, non-stretched film by heating or moisture absorption and recover the original state. That is, the dimensional stability of the stretched film is not good and the wrinkles take place on the film, resulting in deterioration in the smoothness of the film. Such unfavourable tendencies are very remarkable particularly in the case of the poly-ϵ-caproamide resin film, and therefore, it is necessary to apply a heat setting treatment to the stretched film to increase the dimensional stability of the film.

Therefore, the biaxially molecule-oriented film of poly-ϵ-caproamide resin is subjected to heat setting treatment to increase its dimensional stability. According to the present invention, the dimensional stability of the film and the surface slip characteristic thereof are improved by heat-setting the film at a temperature higher than 90°C but less than the melting temperature of crystals under tension under such a condition that the water content of the film is in a range from 1 percent on the basis of the weight of the film to an equilibrium water absorption content in water. That is to say, the simultaneously, biaxially stretched poly-ϵ-caproamide film obtained from substantially amorphous film of poly-ϵ-carproamide resin, has a molecule orientation in a direction parallel to the film surface, but has no strong hydrogen bond and crystal structure almost at all. Therefore, the film is in a very unstable state. To form crystals and strong hydrogen bonds, it seems necessary to promote the stabilization of molecule arrangement during the heat setting by a plasticization effect of water molecules, that is, an increase in the mobility of the molecular chains.

On the basis of such a finding, the present inventors have succeeded in considerably increasing the dimensional stability of the film and the surface slip characteristic thereof by heat-setting the biaxially stretched film of poly-ϵ-caproamide resin in the presence of water in the film in a range from 1 %, preferably 2 % of water content on the basis of the weight of the film, to an equilibrium water absorption content in water, usually about 8 to 9 %, though the equilibrium water absorption content depends upon the degree of crystallization and other characteristics of the film, according to the conventional, heat-setting method.

The tensile strength of the film is also somewhat effectively improved thereby.

According to the present invention, the biaxially molecule-oriented film of poly-ϵ-caproamide resin is heat-set at a film temperature from 90°C to less than the melting temperature of crystals in a humidity atmosphere high enough to keep the water content at least at 1 % to the equilibrium water absorption content in water at the time of heat setting while preventing the film from any shrinkage in both longitudinal and transversal directions. In that case, the ratio of relaxation of the film is preferably about 0 to 10 %.

The Table 4, comparative examples of the dimensional stability, surface slip characteristic and tensile strength of the biaxially stretched film of poly-ϵ- caproamide resin obtained without carrying out the heat setting, or when heat-set at 130°C in the ordinary manner, or when heat-set according to the present invention are shown.

TABLE 4

| Treating method | Water content of the film during the heat setting, % | Dimensional stability of the heat-set film (heat shrinkage at 150°C), % | Surface slip characteristic of the heat-set film (coefficient of friction) | Tensile strength of the heat-set film, kg/cm² |
|---|---|---|---|---|
| No treatment | | 40.8 | 0.95 | 1,850 |
| Conventional method Treatment at water content of less than 1 % | 0.30–0.13 | 32.5 | 0.95 | 1,920 |
| Present method | 0.85–0.65 | 21.5 | 0.90 | 2,050 |
| | 1.2–0.90 | 5.2 | 0.40 | 2,100 |
| | 2.3–1.95 | 3.5 | 0.35 | 2,100 |
| | 8.3–6.5 | 2.0 | 0.23 | 2,100 |
| | 8.3–5.5 | 0.5 | 0.20 | 3,100 |

Thus it is possible to prepare a film having a thickness of 10–60 micron advantageously by the process of the present invention but the process of the present invention is not limited only in such a thickness.

The poly-ε-caproamide resin used in the process of the present invention may contain one or more additives including various kinds of plasticizers and resins.

Now, the present invention will be explained in detail, referring to an example.

Example

Poly-ε-caproamide resin having a mean molecular weight of 30,000 was extruded vertically downward from an annular die having a ring-like slit having a diameter of 200 mm to prepare a tubular film.

At that time, the inside surface of the tubular film extruded from the die slit was cooled through a direct contact with a metallic mandrel having a chromium-plate, mirror surface-like contact face of a radius of curvature, R, of 3 mm at the shoulder part thereof 4, an upper diameter of 170 mm, a bottom diameter of 168 mm and a length of 100 mm, as shown in FIG. 1, within which cooling water was circulated at 15°C, the mandrel being so fixed as to locate at the upper end of the mandrel 150 mm below the die slit, and at the same time the outer surface of the film was cooled with air cooled at 15°C and blown from an air ring so positioned about 100 mm below the die slit, whereby the film was quenched and a substantially amorphous, non-stretched, tubular film having a thickness of 150 microns was produced at a speed of 5 m per minute.

Said non-stretched, tubular film 9 was subjected to controlled heating by means of air rings 12 and 12' having inside diameters of 430 mm and 250 mm, respectively, each having a ring-like slit of clearances of 3 mm, as shown in FIG. 4. Heating air was injected at a blowing outlet temperature of 115°C from the air ring 12 and at a blowing outlet temperature of 40°C from the air ring 12' at a rate of 2.5 m³ per minute, respectively.

The tubular film was stretched by introducing a pressure air into the tube between low speed feeding nip rolls 10 and high speed take-up nip rolls 13. The nip rolls 10 had a speed of feeding the film at 5 m per minute and the nip rolls 13 had a speed of taking up the film at 18 m per minute. A uniform, biaxially molecule-oriented film having a good transparency was obtained in a stabilized manner for a long period of time at a stretching ratio of $D_2/D_1$ of 3.3, where $D_1$ stands for the diameter of non-stretched tubular film and $D_2$ stands for the diameter of the stretched tubular film, in a zone in the travelling direction of said tubular film of the resin defined by the starting point of stretching A which was 40–70 mm distant from the level of the air outlet of the air ring 12, and by the end point of stretching B which was 390–440 mm distant from the level of the air outlet of the air ring 12. The highest temperature of the heating gas at which the gas contacted the tubular film, was 73°C, and the surface temperature of the tubular film between the starting point of stretching and the end point of stretching was a maximum at a level about 50 mm distant downward from the starting point of stretching, that is, about 60°C.

The thus obtained film was heat set by passing the film through a heat setting zone having a relative humidity of 35 %, a temperature of 130°C and a distance of 4 m in the travelling direction of the film at a speed of 18 m per minute and at a ratio of relaxation in the transversal direction of 4 %, after the film has been subjected, in advance, to moisture absorption under a tension upto a water content of 8.5 %, based on the weight of the film. The water content of the film immediately after the heat setting was 1.7 %.

The thus obtained, biaxially molecule-oriented film of poly-ε-caproamide resin had a thickness of about 15 microns and had the tensile breaking strength and the degree of tensile breaking elongation at 20°C and 65 % relative humidity as shown in Table 5.

TABLE 5

| | Tensile breaking strength, kg/cm² | Degree of tensile breaking elongation, % |
|---|---|---|
| Machine Direction | $2.24 \times 10^3$ | 91.0 |
| Transversal Direction | $2.33 \times 10^3$ | 95.0 |

Further, the thus obtained film had a good dimensional stability and surface slip characteristic, and had a heat shrinkage or 0.8 % and a coefficient of friction of 0.29 at 150°C.

The operation could be continued without any trouble for more than a week.

What is claimed is:

1. The method which comprises
   a. extruding a molten tubular film of poly-ε-caproamide resin,
   b. quenching and cooling said molten extruded film in a cooling zone,
   c. withdrawing a tubular film from around said cooling zone, said film
      1. being substantially amorphous,
      2. being substantially free of any hydrogen bond,
      3. being substantially unstretched, and
      4. having a water content of not more than 1 percent by weight,
   d. introducing said tubular film into a stretching zone and biaxially stretching the film at a stretching ratio of between 2 and 4 by introducing a gas under pressure into the interior of the tubular film,
   e. maintaining said tubular film at a temperature within the range between 50° and 60° C. during said biaxial stretching step by introducing said tubular film into a heating zone that extends in the direction of travel of the film, the length of said heating zone being not more than five times the diameter of the non-stretched tubular film, and contacting said tubular film with a heated gas, said heating gas being blown in a direction almost perpendicular to the travelling direction of the film from a point near the starting point of stretching, and at the same time another heating gas is blown along the travelling direction of the film in advance of the starting point of stretching, f. heat setting the biaxially stretched film at a water content of 1 – 9 percent by weight based on the weight of the film, and g. recovering a biaxially molecule-oriented tubular film of poly-ε-caproamide resin having improved dimensional stability and improved surface slip characteristics.

2. The method of claim 1 wherein the stretching ratio of step (d) and the temperature of step (c) are correlated so as to fall within the cross-hatched area II of FIG. 3.

3. The method which comprises
a. introducing into a stretching zone a tubular film composed of a poly-ε-caproamide resin, said resin
1. being substantially amorphous,
2. being substantially free of any hydrogen bond,
3. being substantially unstretched, and
4. having a water content of not more than 2% by weight,
b. biaxially stretching said tubular film after introduction into said stretching zone,
c. maintaining said tubular film at a temperature within the range of 45°C – 70°C during said biaxial stretching step by contacting said tubular film with a heated gas, and
d. recovering a biaxially molecule-oriented tubular film of poly-ε-caproamide resin.

4. A process according to claim 3 wherein the resin set forth in step (a) has a water content of not more than 1 percent by weight.

5. A method according to claim 3 wherein said biaxial stretching is carried out simultaneously in both the longitudinal and transversal directions at a stretching ratio of 2 to 4 by introducing a pressurized gas into the interior of the tubular film.

6. A method according to claim 3 wherein said stretching is carried out at a temperature between about 50°C and 60°C.

7. A method according to claim 3 wherein said heating is carried out in a heating zone that extends in the direction of travel of the film, the length of said heating zone being not more than five times the diameter of the non-stretched tubular film.

8. A method according to claim 7 wherein said heating zone has a diameter which is 2 to 3 times the non-stretched tubular film.

9. A method according to claim 5 wherein the point where the heating gas first contacts the tubular film establishes the starting point of stretching.

10. A method according to claim 9 wherein the heating gas is blown in a direction almost perpendicular to the travelling direction of the film from a point near the starting point of stretching and at the same time another heating gas is blown along the travelling direction of the film in advance of the starting point of stretching.

11. The method which comprises
a. introducing into a stretching zone a tubular film composed of a poly-ε-caproamide resin, said resin
1. being substantially amorphous,
2. being substantially free of any hydrogen bond,
3. being substantially unstretched, and
4. having a water content of not more than 2 percent by weight,
b. biaxially stretching said tubular film after introduction into said zone,
c. maintaining said tubular film at a temperature within the range of 45°C – 70°C. during said biaxial stretching step by contacting said tubular film with a heated gas, and
d. heat setting the biaxially stretched film at a water content of 1 – 9 percent by weight based on the weight of the film, and
e. recovering a biaxially molecule-oriented tubular film of poly-ε-caproamide resin having improved dimensional stability and improved surface slip characteristics.

12. A method according to claim 11 wherein the heat setting is carried out at a water content of from 2 percent to an equilibrium water absorption content in water.

13. The method which comprises:
a. extruding a molten tubular film of poly-ε-ε-caproamide resin,
b. quenching and cooling said molten extruded film by passing it in sliding contact with the exterior surface of an internally cooled mandrel of circular cross section, the radius of curvature of the tubular film that first contacts the exterior surface of the mandrel being not more than 5 mm,
c. withdrawing a tubular film from around said mandrel, said film
1. being substantially amorphous,
2. being substantially free of any hydrogen bond,
3. being substantially unstretched, and
4. having a water content of not more than 2 percent by weight,
d. introducing said tubular film into a stretching zone and biaxially stretching the film at a stretching ratio of between 2 and 4 by introducing a gas under pressure into the interior of the tubular film,
e. maintaining said tubular film at a temperature within the range of 45°C – 70°C during said biaxial stretching step by contacting said tubular film with a heated gas, and
f. recovering a biaxially molecule-oriented tubular film of poly-ε-caproamide resin having improved dimensional stability and improved surface slip characteristics.

14. A method according to claim 13 wherein the tubular film is also cooled as it passes around said mandrel by a cooling fluid that flows in contact with the interior of the tubular film.

15. A method according to claim 13 wherein the exterior of the tubular film is contacted with a cooling fluid as the tubular film passes over the exterior of the mandrel.

16. A method according to claim 13 wherein the exterior of the tubular film is contacted with a stream of cooled air as the tubular film passes over the mandrel.

17. A method according to claim 13 wherein the biaxially molecule-oriented film of poly-ε-caproamide after stretching is heat-set while maintaining the water content of the film between 1 percent and 9 percent based on the weight of the film.

* * * * *